United States Patent Office 3,743,555
Patented July 3, 1973

3,743,555
EMULSIFIED HYDRAZINE-BASED FUEL COMPOSITION
Beverly A. H. Seaman, Midland, Mich., assignor to The Dow Chemical Company, Midland, Mich.
No Drawing. Filed July 18, 1968, Ser. No. 747,033
Int. Cl. C06c 1/02
U.S. Cl. 149—36         9 Claims

ABSTRACT OF THE DISCLOSURE

The present disclosure concerns novel oleyl sarcosine-based emulsifying agents, and novel emulsions comprising said emulsifying agent, hydrazine and/or its derivatives and a hydrocarbon.

BACKGROUND OF THE INVENTION

The invention herein described was made in the course of or under a contract or subcontract thereunder, with the Department of the Air Force.

Prior to the present invention, many relatively unsuccessful attempts have been made to emulsify hydrazine or derivatives thereof so that they would be easier and safer to handle when employed as fuels in various types of missiles, projectiles, etc. Generally the emulsions have been difficult to formulate, requiring many tedious and detailed incremental admixings of the reactants. Often the resulting emulsions have been unstable. For example, on standing or in storage, hydrazine emulsions often undergo phase separations, or the ingredients thereof may interact, especially when a solid phase, such as a particulated, high energy metal or metal hydride fuel is present in the emulsion.

Attempts have been made to emulsify systems wherein hydrazine is combined with a hydrocarbon. Generally the emulsifier employed has been an ester of a fatty acid, and this has reacted with the hydrazine to yield a hydrazide. The so-formed hydrazide has different surfactant properties than the hydrazine being frequently insoluble therein.

Additionally, systems emulsified with esterified fatty acids have proved to be incompatible, evidencing phase separation and degradation or interaction between the reactants, especially when a particulated metal or metal hydride fuel is present in the emulsion.

An advantage of the emulsified systems of the present invention resides in the ease with which said emulsified systems can be prepared. The emulsion can be prepared simply and quickly because the ingredients emulsify spontaneously with no need for incremental additions, and the mixing requires relatively low energy input. Additionally, the order of addition of the components to one another is not critical, and a solid phase such as a metal hydride fuel can be added at any convenient point in the preparation in a dry state, or after it has been "pre-wetted" with one of the other components. Also, the emulsion forms well over a wide range of different combinations of the components thereof.

Other advantages of the present invention reside in the unique stability of the emulsions. The emulsified systems of the present invention can be stored without phase separation and with consistent rheological properties at about 25° C. for long periods of time, and this is especially true where the system contains a particulate metal or metal hydride fuel. For all practical purposes, the components are unreactive with each other.

Still another unexpected advantage of the emulsified systems of the present invention is that the addition of a particulated solid fuel such as a metal or metal hydride increases the internal phase capacity and storageability of the emulsion. The yield stress of the emulsified solid fuel-containing system, e.g., the resistance of said system to flow or deformation when subjected to external forces, is adequate to prevent separation of the solid phase under the vibrational and gravitational forces encountered during shipment and use of the fuel.

Still another advantage of the present emulsified systems is that a wide range of hydrocarbons can be employed therein to form the discontinuous or external phase without significantly reducing the stability or excellent physical properties of the emulsion.

It is an object of the present invention to provide a novel emulsifier for mixtures of hydrocarbons with hydrazine-based fuels.

It is also an object of the present invention to provide a method for producing said emulsifier.

Still another object of the present invention is to provide novel emulsions comprising hydrazine-based fuels and a hydrocarbon, and optionally a particulated solid fuel such as a light metal or metal hydride.

These and other objects and advantages of the present invention will become apparent from the following description thereof.

SUMMARY OF THE INVENTION

The present invention comprises a novel emulsifying agent and novel emulsions utilizing said emulsifying agent.

The novel emulsifying agent of the present invention comprises on a weight basis from about 99 to about 85 percent oleyl sarcosine

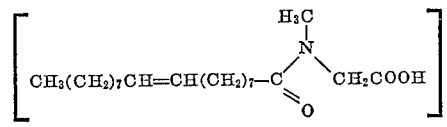

and from about 1.0 to about 15 percent hydrazine.

A preferred embodiment of the emulsifying agent comprises on a weight basis from about 97 to about 91 percent oleyl sarcosine and from about 3 to about 9 percent hydrazine.

Generally, the emulsifying agent is prepared by contacting sufficient quantities of oleyl sarcosine and hydrazine so that the resulting reaction mixture comprises on a weight basis from about 0.4 to about 15 percent oleyl sarcosine and from about 99.6 to about 85 percent hydrazine. Preferably the reaction mixture will comprise by weight from about 1 to about 5 percent oleyl sarcosine and from about 99 to about 95 percent hydrazine. During contacting, the temperature of the reaction mixture is maintained at about room temperature, e.g. from about 18 to about 25° C., and said reaction mixture is agitated until the oleyl sarcosine has substantially dissolved in the hydrazine. The so-formed hydrazine solution of oleyl sarcosine is maintained at about 25° C. for at least about seven days, and preferably from about 7 to about 11 days. Optionally, formation of the emulsifying agent can be accelerated by maintaining the solution at from about 50° C. to about 60° C. for from about 10 to about 20 hours. Good results can be obtained in even shorter periods of time by maintaining the hydrazine solution of oleyl sarcosine at from about 80° C. to about 85° C. for from about 1 to about 4 hours. The so-treated reaction mixture consists essentially of a hydrazine solution of the emulsifying agent.

The emulsifying agent can be separated from the solution by commonly employed means such as distilling over the residual hydrazine in the presence of a vacuum. Conveniently, the emulsifying agent need not be separated from the hydrazine solution and can be employed as the hydrazine solution in preparing emulsions based on hydrazine and/or its derivatives.

Regardless of whether the emulsifying agent is isolated or is employed in the hydrazine solution, the yield and purity of the agent will be increased if said emulsifying agent is prepared in a substantially anhydrous, inert atmosphere, such as, for example, nitrogen or argon. Generally, the hydrazine employed in preparing the emulsifying agent will also have a low water content, e.g., said hydrazine will comprise less than about 2.5% water by weight, and preferably less than about 1% water by weight. Preferably, the hydrazine will be substantially anhydrous.

One embodiment of the present invention is a hydrocarbon emission comprising by weight from about 0.4 to about 10 percent of the oleyl sarcosine-based emulsifying agent described above, from about 1 to about 20 percent of a hydrocarbon as the external or continuous phase, and from about 98.6 to about 70 percent of a hydrazine-based fuel as the internal or discontinuous phase.

Another embodiment of the present invention is the solid phase emulsion comprising by weight from about 0.2 to about 3 percent of the oleyl sarcosine emulsifying agent described herein before, from about 0.5 to about 12 percent of a hydrocarbon, from about 4.5 to about 59 percent of a hydrazine-based primary fuel, and from about 20 to about 60 percent of a particulate light metal or light metal hydride as the solid phase fuel.

The solid phase fuel is generally aluminum, beryllium, lithium, magnesium, or alloys or hydrides thereof.

Where aluminum hydride is the secondary fuel, appropriate pretreatment of the fuel should be undertaken before emulsification. Presently employed methods such as coating with inert polymeric materials or other inert materials sorbed onto or into the hydride, or controlled hydrolysis within predetermined limits to reduce crystalline surface irregularities, such as for example, by treatment with butyl amines or a buffered aqueous solution, are ordinarily sufficient to insure compatibility of the aluminum hydride with other components of the emulsion.

Hydrocarbons which can be employed in the present invention are generally aliphatic and/or aromatic hydrocarbons which boil at from about 150° C. to about 400° C. Such mixtures can contain cyclic, alicyclic, aromatic, and aliphatic branched-chain and straight-chain hydrocarbons. Mixtures of hydrocarbons having about 10 carbon atoms can be employed with good results. Especially good results can be obtained where the hydrocarbon mixture consists essentially of normal decane. Other mixtures of hydrocarbons yielding good emulsions are fuel oils boiling from about 250° C. to about 400° C. and kerosene boiling in the range of from about 175° C. to about 300° C. Jet fuels which correspond to specifications set forth by the U.S. Government, e.g., which exhibit flowability at about minus 60° F., and which are substantially free of sulfur-containing compounds, can also be employed as the hydrocarbon in the present invention. Normal nonane, and mixtures of hydrocarbons having 9 carbon atoms can be employed. It should be noted that all boiling ranges described above are for a pressure of one atomsphere.

Hydrocarbon-based fuels which can be employed in the present embodiment of the invention are hydrazine, monomethylhydrazine, unsymmetrical dimethyl hydrazine

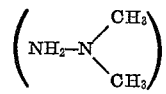

hydrazine nitrate ($N_2H_4 \cdot HNO_3$), or mixtures thereof Typical mixtures of hydrazine-based fuels commonly employed are (on a weight basis) 50% hydrazine and 50% unsymmetrical dimethyl hydrazine; 55% monomethylhydrazine, 26% hydrazine, and 19% hydrazine nitrate; 23.3% hydrazine, 31.4% hydrazine nitrate, and 45.3% monomethylhydrazine; 14% hydrazine and 86% monomethylhydrazine; and 32.5% hydrazine, 17% hydrazine nitrate, and 50.5% methylhydrazine.

To prepare the above described emulsions, the reagents are admixed in any order at ordinary temperatures such as about 25° C. The emulsion forms almost immediately. Generally the emulsion is prepared in a substantially anhydrous, inert atmosphere, such as a "dry" nitrogen atmosphere. The hydrazine-based fuel employed should also have a low water content, e.g. contain less than about 2.5 percent by weight of water and preferably be substantially anhydrous. When the emulsion contains a solid phase such as aluminum hydride, the hydrazine should contain less than about 1 percent by weight of water.

A preferred embodiment of the present invention is the emulsion comprising by weight from about 1 to about 3 percent of the oleyl sarcosine-based emulsifying agent, from about 3 to about 10 percent of a hydrocarbon, and from about 90 to about 95 percent of a substantially anhydrous hydrazine as the hydrazine-based fuel.

Another preferred embodiment of the present invention is the emulsion comprising from about 0.5 to about 1.5 percent of the oleyl sarcosince-based emulsifying agent, from about 1 to about 5 percent of a hydrocarbon, from about 53 to about 63 percent of substantially anhydrous hydrazine as the hydrazine-based fuel, and from about 35 to about 45 percent of a light metal or light metal hydride as the solid phase fuel.

In the preferred embodiments described above, the hydrocarbon is generally substantially similar to those hydrocarbons described hereinbefore. Most preferably the secondary fuel employed will be particulate aluminum hydride appropriately pretreated by any commonly employed means.

The preferred embodiments are prepared by admixing the reagents in any order at ordinary temperatures such as room temperature or about 25° C. All preparation of the preferred embodiments is carried out in a nitrogen, argon, or other inert, substantially anhydrous atmosphere. The hydrazine should contain less than about 1% by weight of water.

The following examples are set forth to illustrate the present invention and shoud not be construed as limits thereto.

Example 1

Samples of the oleyl sarcosine-based emulsifying agent of the present invention were prepared by contacting one part by weight of Sarcosyl O (a Geigy Industrial Chemicals trademark designation for oleyl sarcosine), with about 55.5 parts by weight of propellant grade anhydrous hydrazine containing less than about 1% by weight of water. The so-contacted reagents were admixed until the oleyl sarcosine was substantially dissolved in the hydrazine. The resulting solution was heated to about 55° C. and was maintained at this temperature for about 18 hours. Upon cooling to about 25° C. the reaction mixture appeared to be slightly gelatinous in nature. The gelled reaction mixture is essentially a hydrazine solution of the emulsifying agent.

All preparatory operations were conducted in a substantially anhydrous, nitrogen atmosphere.

The emulsifying agent can be separated from the reaction mixture by subjecting the gel to vacuum distillation thereby distilling over the excess hydrazine.

Example 2

The gel prepared in Example 1 was admixed with about 3.5 parts by weight of n-decane while agitating the admixture with a shaking motion. A thin emulsion wherein hydrazine was the external or continuous phase formed swiftly, but reverted to the more stable emulsion wherein the hydrocarbon is the external phase. The decane emulsion was prepared in a substantially anhydrous nitrogen atmosphere.

The emulsifying agent can be isolated from this decane emulsion by evaporating off the hydrazine and hydrocarbon using a rotary evaporator with gentle heating. The emulsifying agent so-recovered is a colorless, waxy, amorphous solid. The colorless, waxy material was very soluble in anhydrous hydrazine, and water, but only slightly soluble in decane. The emulsifier appeared to be substantially insoluble in carbon tetrachloride and carbon disulfide.

When subjected to differential thermal analysis, the solid emulsifier exhibited endotherms at about 25–58° C., 58–98° C., 197–210° C., and 212–260° C. The material exhibited exotherms at from about 98–197° C., and about 260–300° C. Thermal "peaks" were exhibited at about 50° C., 85° C., 206° C. and 240° C.

Example 3

About 3.5 grams of jet fuel corresponding to U.S. Government specification, e.g., exhibiting flowability at about minus 60° C., and being substantially free of sulfur-containing compounds was admixed with about 56 grams of a gelatinous anhydrous hydrazine solution of the emulsifying agent. The solution was substantially similar to the solution prepared in Example 1. The admixture was agitated and the resulting emulsion formed in several minutes. The emulsion was prepared in a substantially anhydrous nitrogen atmosphere.

Example 4 n-Decane was admixed with about 67 grams of a solution of the oleyl sarcosine-based emulsifying agent. By weight, the concentration of the solution contained about 2 percent of the emulsifying agent as solute. The mixture was manually agitated for a brief time and an emulsion rapidly formed with n-decane as the external phase. A slurry comprising about 81 grams of anhydrous hydrazine and about 98 grams of solid aluminum hydride was blanded into the decane emulsion, and the so-formed blend was agitated until homogenous in nature. The emulsion formed almost immediately and contained the aluminum hydride as a suspended solid phase. The solid phase was compatible with the other components of the emulsion and exhibited no tendency to settle out. When stored at about 25° C., the emulsion was stable indefinitely. The hydride was pretreated by contact with normal butylamine, before being slurried with the hydrazine.

All steps in preparing the decane and solid phase emulsions were carried out in a substantially anhydrous nitrogen atmosphere at about 25° C.

The aluminum hydride emulsion exhibited a density of about 1.14 g./cc. The yield stress was about 825 dynes/cm.$^2$. The emulsion was stable at temperatures ranging from about minus 20° C. to about plus 55° C. The acceleration stability of the emulsion was obtained by centrifuging the material for extended periods of time. After one hour, no separation was detected in the emulsion when the centrifugal force was about 48 times the force of gravity measured at sea level. At 190 times the force of gravity, no separation was detected after 10 minutes.

The compatibility of the components of the emulsion was evidenced by the fact that the gas generation rate was only .033 cc./lb. min. at a temperature of about 60° C. Within the stability range of about minus 20° C. to about 55° C., described herein above, the already negligible gas generation rate is reduced even further.

Example 5

An emulsion containing aluminum as the suspended solid phase was compounded by employing a process substantially similar to that described in Example 4, the only difference being the substitution of the aluminum for the aluminum hydride. The particles of aluminum averaged about 5 microns in size.

The so-formed aluminum emulsion was stable almost indefinitely when stored at about 25° C. The solid phase exhibited no tendency to settle out nor was there any noticeable reaction between the components of the emulsion.

Various modifications can be made in the present invention without departing from the spirit or scope thereof for it is understood that I limit myself only as defined in the appended claims.

I claim:

1. An emulsion comprising by weight from about 0.4 to about 10 percent of oleyl sarcosine-based emulsifying agent, said agent comprising from about 99 to about 85 percent oleyl sarcosine and from about 10 to about 15 percent hydrazine, from about 1 to about 10 percent of a mixture of hydrocarbons boiling at from about 150° C. to about 400° C., and from about 98.6 to about 70 percent of a hydrazine based fuel.

2. The emulsion described in claim 1 wherein the hydrazine-based fuel is a member selected from the group consisting of hydrazine, monomethylhydrazine, unsymmetrical dimethyl hydrazine, nitrohydrazine, or mixtures thereof.

3. The emulsion described in claim 1 comprising by weight from about 1 to about 3 percent of oleyl sarcosine-based emulsifying agent, from about 3 to about 10 percent of a hydrocarbon, and from about 90 to about 95 percent of substantially anhydrous hydrazine.

4. The emulsion described in claim 1 and comprising on a weight basis from about 0.2 to about 3 percent of oleyl sarcosine-based emulsifying agent, from about 0.5 to about 12 percent of a hydrocarbon, from about 45 to about 59 percent of a hydrazine-based fuel, and from about 20 to about 60 percent of a member selected from the group consisting of light metals or light metal hydrides as solid phase fuel.

5. The emulsion defined in claim 1 comprising on a weight basis from about 0.5 to about 1.5 percent of oleyl sarcosine-based emulsifying agent, from about 1 to about 5 percent of a hydrocarbon, from about 53 to about 63 percent of hydrazine, and from about 35 to about 45 percent of a member selected from the group consisting of aluminum, beryllium, lithium, magnesium and alloys or hydrides thereof, as a fuel.

6. The emulsion defined in claim 4 wherein the primary hydrazine-based fuel is hydrazine, and the light metal hydride fuel is aluminum hydride.

7. The emulsion defined in claim 1 wherein the hydrocarbon consists essentially of normal decane.

8. The emulsion defined in claim 1 wherein the hydrocarbon is a fuel oil which boils at from about 250° C. to about 400° C. at one atmosphere pressure.

9. The emulsion defined in claim 1 wherein the hydrocarbon is jet fuel exhibiting flowability at about minus 60° F., said jet fuel being substantially free of sulfur-containing compounds.

References Cited

UNITED STATES PATENTS

| | | | |
|---|---|---|---|
| 3,164,505 | 1/1965 | Hsieh et al. | 149—36 |
| 3,232,801 | 2/1966 | Bost et al. | 149—36 X |
| 3,343,931 | 9/1967 | Doyle | 149—36 X |

STEPHEN J. LECHERT, Jr., Primary Examiner

U.S. Cl. X.R.

149—87; 44—51

PO-1050
(5/69)

UNITED STATES PATENT OFFICE
CERTIFICATE OF CORRECTION

Patent No. 3,743,555            Dated 3 July 1973

Inventor(s) Beverly A. H. Seaman

It is certified that error appears in the above-identified patent and that said Letters Patent are hereby corrected as shown below:

Column 2, line 37, delete "1.0" and substitute therefor --1--.

Column 3, line 13, delete "emission" and substitute therefor --emulsion--.

Column 4, line 22, delete "sarcosince" and substitute therefor --sarcosine--.

Column 6, line 17, delete "10" and substitute therefor --1--; line 18, delete "10" and substitute therefor --20--.

Signed and sealed this 25th day of December 1973.

(SEAL)
Attest:

EDWARD M. FLETCHER, JR.        RENE D. TEGTMEYER
Attesting Officer               Acting Commissioner of Patents